United States Patent [19]
Tichenor et al.

[11] Patent Number: 5,439,240
[45] Date of Patent: Aug. 8, 1995

[54] BALANCE SHIFTED PERSONAL CARRIAGE

[76] Inventors: Clyde L. Tichenor, 15524 Cohasset St., Van Nuys, Calif. 91406; Irwin Ginsburgh, 24125 Clearbank La., Newhall, Calif. 91321

[21] Appl. No.: 779,621

[22] Filed: Oct. 21, 1991

[51] Int. Cl.6 ............................. B62M 1/02; B62M 1/04
[52] U.S. Cl. ............................. 280/250.1; 280/253; 280/254; 280/259
[58] Field of Search ............... 280/250.1, 304.1, 259, 280/253, 254; 180/65.2, 907

[56] References Cited
U.S. PATENT DOCUMENTS

| | | | |
|---|---|---|---|
| 1,597,639 | 8/1926 | Von Glahn | 280/254 |
| 3,953,054 | 4/1976 | Udden et al. | 280/250.1 |
| 4,453,729 | 6/1984 | Lucken | 280/253 |
| 4,475,613 | 10/1984 | Walker | 180/907 |
| 4,513,832 | 4/1985 | Engman | 180/907 |
| 4,762,332 | 8/1988 | Seol | 280/253 |
| 4,934,725 | 6/1990 | Owens | 280/304.1 |
| 5,007,655 | 4/1991 | Hanna | 280/254 |

FOREIGN PATENT DOCUMENTS

3612891 11/1987 Germany .................... 280/250.1

*Primary Examiner*—Margaret A. Focarino
*Assistant Examiner*—Anne Marie Boehler
*Attorney, Agent, or Firm*—Albert O. Cota

[57] ABSTRACT

A balance-shifted personal carriage (19) designed for physically challenged persons such as paraplegics confined to wheelchairs. The carriage (19) basically consists of a base frame assembly (13) that supports a seating assembly (15) a pair of free pivoting wheels (18) located in the front, a pair of steerable wheels (20) controlled by the rider and located in the back, and a centrally located power wheel (22) that is controlled by the rider. The balanced-shifted carriage (19) is operated in either of two modes of operation: in Mode 1, the rider shifts their weight backwards to allow the steerable wheels to contact the floor at which time the power wheel (2) is made to rotate to propel the carriage; in Mode 2, the rider shifts their weight forward to cause the steerable wheels (20) to rise and allow the pivoting wheels (12) to contact the floor allowing the rider to pivot and move the carriage away from an obstacle.

18 Claims, 7 Drawing Sheets

BALANCE SHIFTED PERSONAL CARRIAGE

TECHNICAL FIELD

The invention pertains to the general field of ambulatory wheel chairs and more specifically, to a personal carriage for particular use by young or active physically challenged persons. The carriage is pivotally balanced to allow two operational modes; one for steering the carriage and the other to allow the rider to easily move away from an encountered obstacle.

BACKGROUND ART

Conventional ambulatory wheelchairs are not designed to fit into the normal ambulatory passage spaces in homes, shops, and business. Their turning radius can be minimized, but their over-all dimensions often create interference with nearby obstacles.

Prior art wheelchairs have remained essentially the same for many years and are primarily for persons of limited capabilities such as the elderly physically challenged persons. Young and athletic physically challenged persons have to mentally adjust to the sedentary restrictions imposed by current wheel chairs. Their physical ability allow them to actively utilize a carriage without such conventional restrictions and limitations. Instead of putting them in a box, this chair essentially replaces the legs and allows normal torso use above the hips.

A search of the prior art did not disclose any patents that read directly on the claims of the instant invention. However, the following U.S. Patents were considered related:

| U.S. PAT. NO. | ISSUE DATE | INVENTOR |
| --- | --- | --- |
| 4,927,167 | 2 May 1990 | Davis |
| 4,560,181 | 24 Dec. 1985 | Herron |
| 4,506,901 | 26 Mar. 1985 | Tosti |
| 4,310,167 | 12 Jan. 1982 | McLaurin |

The Davis patent discloses an ambulatory wheel stand that includes a user support structure pivotally attached to a wheeled frame. The frame includes a pair of large diameter drive wheels and a pair of front castor wheels. A pivot arm connects the support structure to the frame so that the structure can pivot from an upright to a prone position. As the support structure is lowered to a prone position, a hinge pin slides rearwardly in an elongated slot to prevent the center of gravity from shifting too far forward. Conversely, when in the upright position, the hinge pin slides to the forward end of the slot to maintain the center of gravity in the same position.

The Herron patent discloses a wheel chair and a drive mechanism that is powered by reciprocating operation of a drive lever. The drive mechanism provides a continuously variable gear ratio to allow wheel chair operation at various speeds on different surfaces. The mechanism also allows energy to be transferred during both a forward and rearward stroke of the lever arm.

The Tosti patent discloses a hand-propelled vehicle for particular use of physically challenged individuals. The vehicle includes a frame with a seat portion and an extended front foot platform. Rear wheels support the seat portion relatively to the ground, and the height of the front foot platform is about half the height of the seat portion. This configuration gives the vehicle a low profile to facilitate mounting and dismounting by the user. A hand crank operates chain and sprocket drives and connected to each rear wheel are castors. The castors are mounted to support the front foot platform and to permit the vehicle to turn.

The McLaurin patent discloses a center of gravity wheel chair having an articulated chassis whereby the seat and the center of gravity may be moved forwardly relative to the rear wheels. Thus, increasing the stability and facilitating curb climbing.

The wheel chair has castor wheels in front or back attached in a diamond pattern with the main wheels attached so that lateral side drift is minimized when traversing a sloping surface.

The wheelchair has castor wheels in front or back attached in a diamond pattern with the main wheels attached so thet lateral side drift is minimized when traversing a sloping surface.

DISCLOSURE OF THE INVENTION

The balance shifted personal carriage is designed to provide two primary balance modes of operation but its wheel base stability is such that it may also be tilted sideways resting on a front and back wheel as well as the center wheel thus preventing tipping over. While this non-tipping feature does not provide advantages in movement it does allow variations in how the user sits and by thus shifting the seat pressure point it contributes to useful variations in tissue blood circulation.

The present invention is designed to allow freedom of movement in place as well as steering capability when traveling. It is compact and designed to fit within the normal confines of a home, office, or shop as used by normal ambulatory people.

It may be steered, turned, pushed and pulled, and it readily can accommodate normal sills and ramp levels by the handicapped operator; or easily tilted by someone assisting to access high steps or curbs, It is intended to be utilized in variations that allow operation by hand/arm movements, by push/pull levers, by hand cranks, or an electric drive. To use the forward free pivoting castor type wheels, the rider can lean forward and the carriage acts like an office chair and pivots in place and its position may be easily adjusted by its operator pushing or pulling on nearby fixed objects.

If the rider leans backward, the steering wheels in back engage the floor, and by using the steering mechanism and the forward/back drive, the operator may travel much as an ambulatory person.

A physically active rider who is accustomed to this personal carriage can rapidly switch between the various modes of operation and move about rapidly in a near normal manner in a setting designed for a normal ambulatory person. This creates both a healthier life style and greater mental acceptance.

BRIEF DESCRIPTION OF THE DRAWINGS

FIG. 4 is a front elevational view of the present invention.

FIG. 5 is a top plan of the power wheel/seat support frame assembly.

FIG. 6 is divided into three views: A. A top plan view of the base frame assembly. B. A back end elevational view of the left steerable wheel assembly. C. A side elevational view of the safety leg assembly.

FIG. 11 is divided into two parts: A. Depicts a hand control pull cable assembly connected to the steerable wheel pin lever assembly. B. Depicts a hand control hydraulic line assembly connected via piston to the steerable wheel pin lever assembly.

FIG. 12 is divided into four parts: A. Is a partial section and front view of the central part of the dual opposed hand crank assembly. B. Is a side elevational view of the shaft drive idler. C. Is a sectional end view of the shaft drive idler coupling to the hand crank drive shaft. D. Is a side view of the chain sprocket wheel.

BEST MODE FOR CARRYING OUT THE INVENTION

The best approach to build the balance shifted personal carriage 19 is presented in terms of a preferred embodiment, that is shown in FIGS. 1 through 15. The carriage 19 is comprised of the following major elements: a base frame assembly 13, a power wheel/seat support frame assembly 14, a seat assembly support frame 15, a seating assembly 16, a pair of free-pivoting caster-type wheels 18, a pair of steerable wheels 20 on steerable wheel axles 20e, a means for steering the steerable wheels using a thumb and finger lever 26, a power wheel 22 mounted on power wheel axle 23, a means for rotating the power wheel by a dual opposed hand crank 24, a brake system using a drive/brake lever assembly 44, and a mounting safety/lock 58 through 62.

Figure 1:
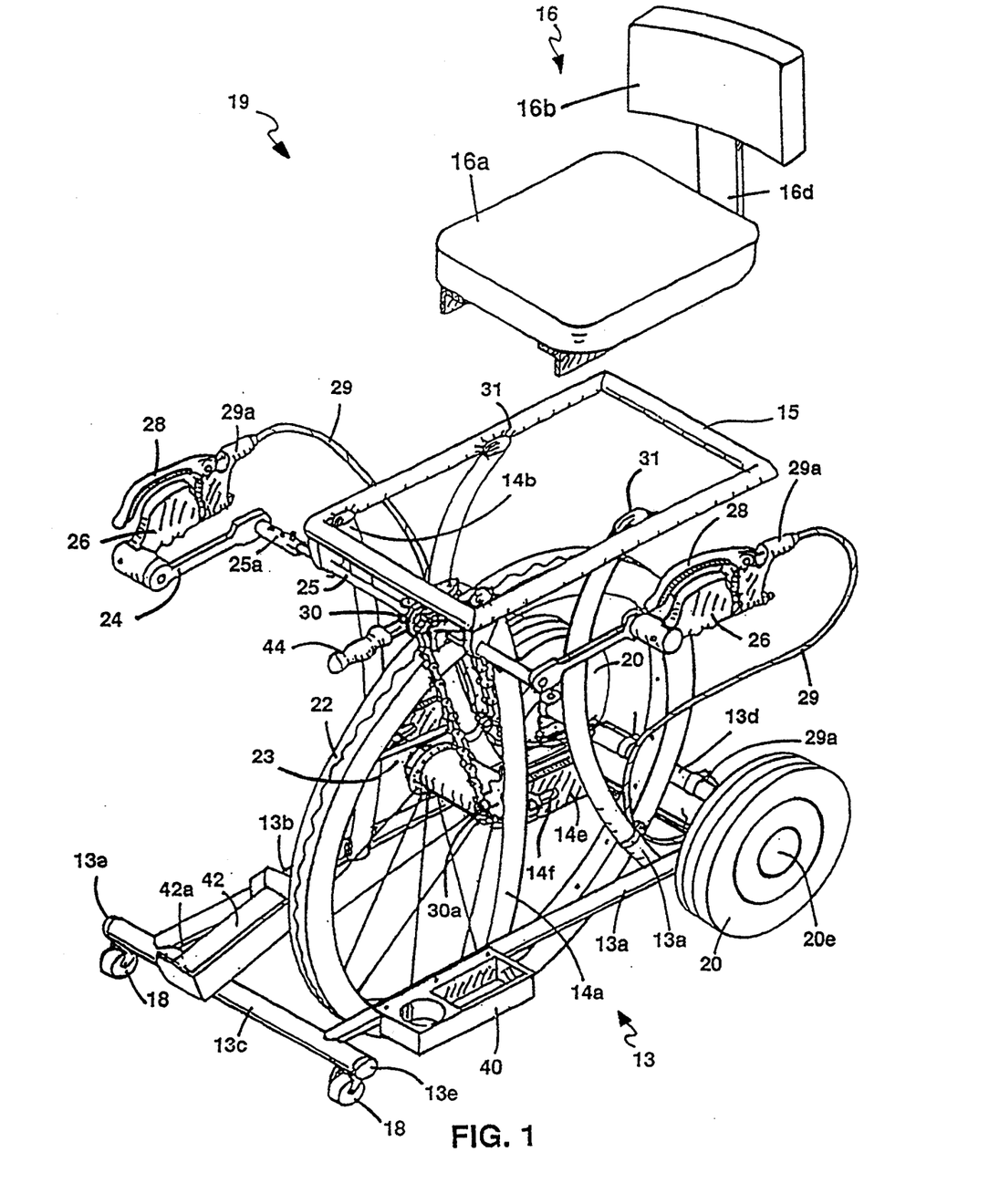
FIG. 1 is an isometric view of the balance shifted personal carriage with minor simplifications to aid visualization.

Referring to FIG. 1, the balance shifted personal carriage 19 is designed to be used by physically challenged persons such as paraplegics who are otherwise confined to wheelchairs. The balance shifted personal carriage 19 allows in-place freedom of movement, provides self powered means and steering capability using the thumb finger lever 26 which functions in combination with a squeeze lever 28 when moving and will fit within the normal confines of a home, office or other work station. Additionally, the balance shifted personal carriage 19 can accommodate normal sill levels and can be easily tilted by a person assisting the carriage rider to access high steps or curbs. It is also small enough to fit in a car and can be designed to weigh less that 20 pounds.

Figures 2, 3:
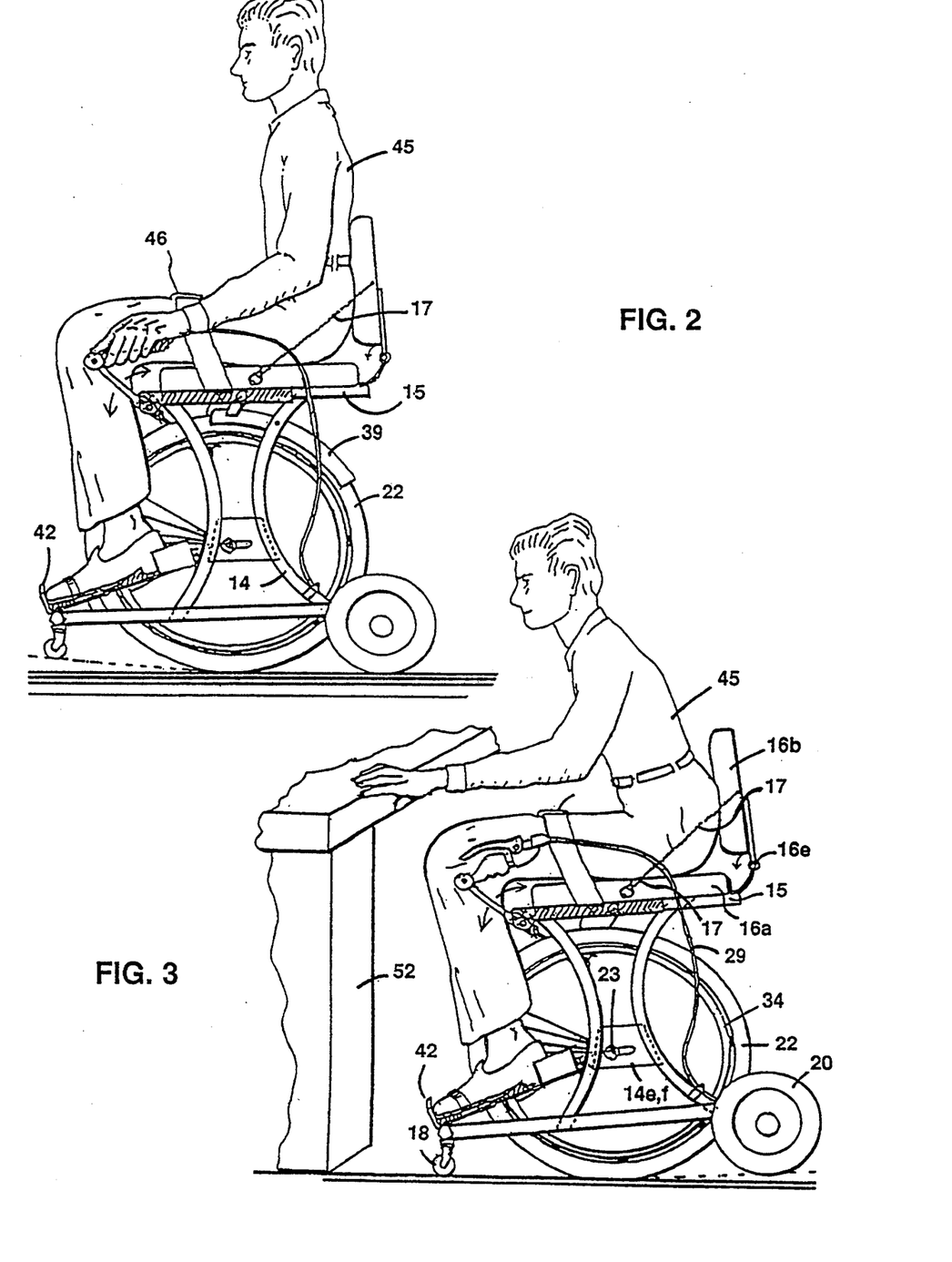
FIG. 2 is side elevational view of the present carriage with a seated rider leaning back so the steering wheels touch the floor.
FIG. 3 is side elevational view of the carriage with a seated rider leaning forward so the free pivoting caster type wheels touch the floor. The operators hand is pushing or pulling against an obstacle—counter, chair, wall, etc.

The balance shifted personal carriage 19 is designed to be operated by the rider in either of two modes of operation as shown in FIG. 2 and 3: in FIG. 2, the seated rider 45 shifts their weight backwards to allow the steerable wheels 20 to move downwardly and make contact with the floor surface 50. When such contact is made, the carriage can be steered by the seated rider as described infra. In FIGURE the seated rider shifts their weight forward to cause the steerable wheels 20 to rise above the floor and allow the free-pivoting wheels 18 to make contact with the floor surface 50. In this mode, the seated rider can pivot or move the carriage away from a counter, chair or wall 52, by pushing away from the object or pulling on the object, to allow the free-pivoting wheels 18 to move the balance shifted personal carriage 19 in a direction opposite the pushing or pulling effort. A pair of foot rests 42, held by foot rest fasteners 42a, and a lap belt 46 attached to a structural member are used by the seated rider 45. In FIG. 1 the left foot rest 42 is not shown for clarity and instead a carrier tray 40 to hold beverages and miscellaneous items is shown.

The balance shifted personal carriage 19 essentially replaces the rider's legs and their torso may be then used normally. In FIG. 2, balanced on the power wheel 22 and the steerable wheels 20, if the carrier tips to either side the appropriate pivoting wheel 18 comes down to the floor and prevents further tipping. Similarly in FIG. 3, balanced on the power wheel 22 and the pivoting wheels 18, a side tipover is prevented when the appropriate steerable wheel 20 touches the ground. Thus in either case, three wheels touch the ground and stabilize the carriage. In each case the power wheel 22 is the third supporting wheel.

In its basic structural configuration, the balance shifted personal carriage 19 consists of the basic frame assemblies 13, 14 and 15 to which is attached the seating assembly 16.

Figures 6A, 6C:
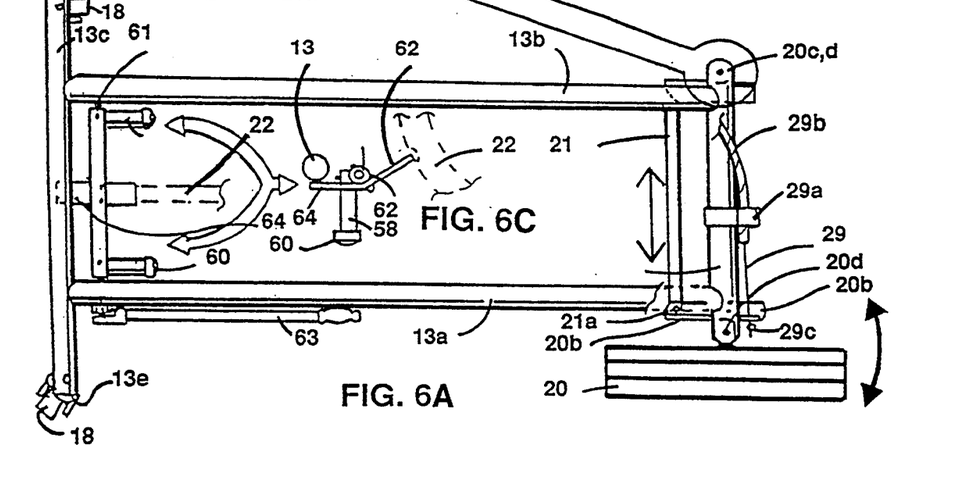

A free-pivoting wheel 18 and a front member bumper 13e is attached to each front corner, and a steerable wheel 20 is attached to each back corner opposite the corners where the pivoting wheels are attached. A power wheel 22 is mounted substantially in the center of the carrier between the free pivoting caster type wheels 18 and the steerable wheels 20. In the preferred embodiment, the base frame assembly 13 as best shown in FIG. 1 and 6a, consists of a left member 13a and a right member 13b. Rigidly attached to the right and left member is a front member 13c and a back member 13d.

The power wheel and seat support frame assembly 14, as shown in FIGS. 1, 2, and 3, can be made in various designs and configurations. One such design as best shown in FIG. 1 consists of two curved vertical left members 4a and two curved vertical right members 14b, each pair is welded 31 to the right and left power wheel supports 14e, also shown in FIG. 1, and also rigidly welded 31 to the power wheel and seat support frame assembly 15 and the base frame assembly 13. The power wheel 22 is mounted midway between the two power wheel support frames 14e by bolting its axle through a slot 14f, 14g. The slot is located in each power wheel support frame 14e and allows for chain drive assembly 30 tension adjustment so that it can drive the power wheel chain sprocket 30a.

Figures 4, 5, 6B:
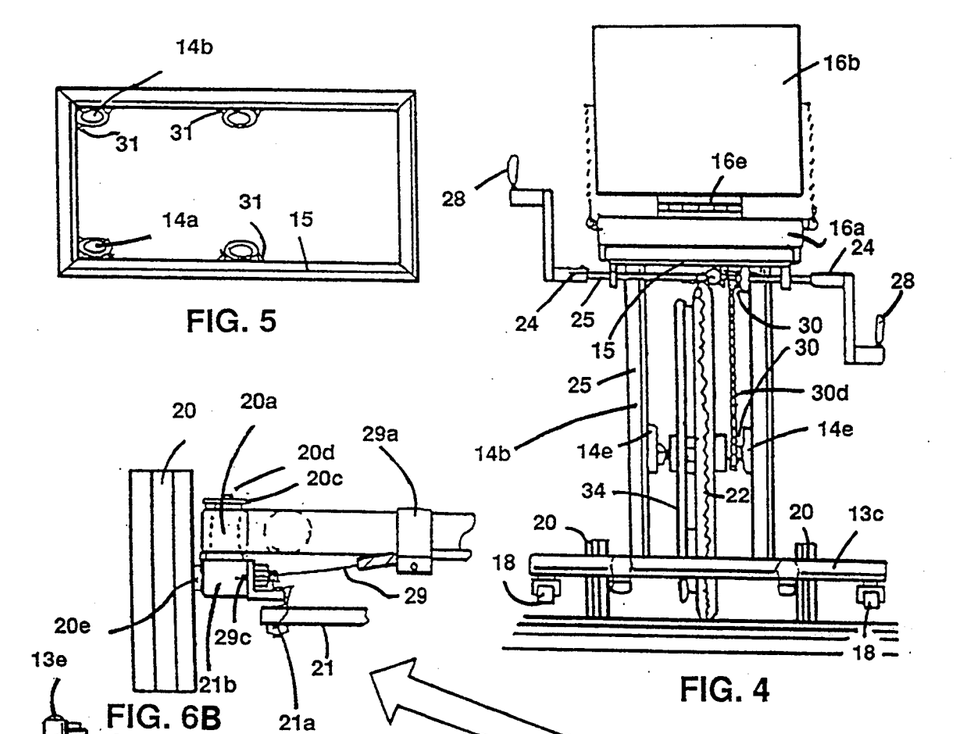

On the upper structure of the right and left members 14a, 14b is rigidly attached the seating assembly support frame 15 as best shown in FIGS. 1, 2 and 5. Adjustably attached to the frame 15 is the seating assembly 18 that consists of a conventional seat 16a and a folding back 16b with a hinge 16e and restrained by two seat back limit cables 17 also shown in FIG. 14. The seating assembly 16 may be adjusted longitudinally by any of various adjusting means that are well known in the art and therefore are not described. The longitudinal adjustment is important for weight balance to optimize the rider's ability to easily pivot from a Mode 1 position as shown in FIG. 2 and to a Mode 2 position as shown in FIG. 3 or vice versa.

Figures 13, 14:
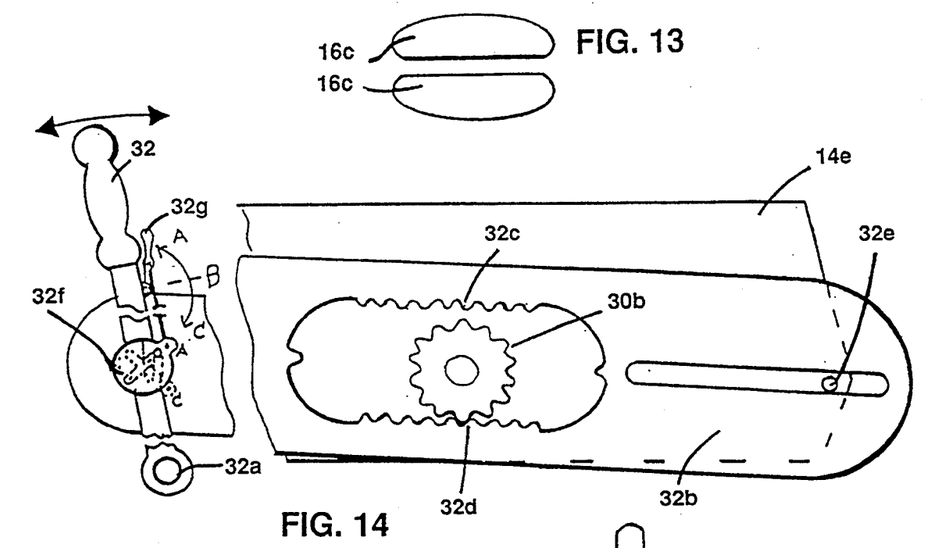
FIG. 13 is a top plan view of the dual seat pad configuration.
FIG. 14 is a side elevational view of the push-pull reciprocating vertical drive lever assembly.
Figure 15:
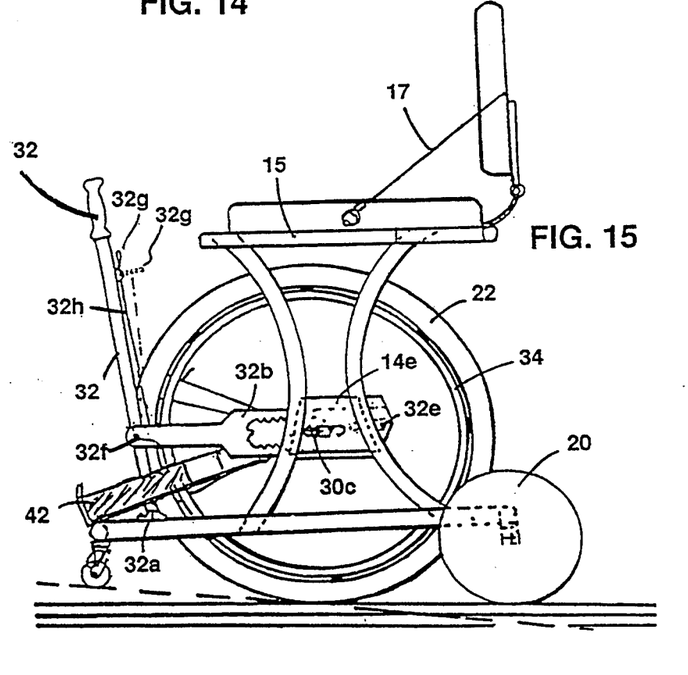
FIG. 15 is a side elevational view of the push-pull reciprocation vertical drive lever assembly attached to the carriage.

The seat assembly 16 may be constructed as a conventional straight seat 16a as shown in FIG. 1, or the seat may be constructed with side-by-side identical double contoured seat 16c as shown in FIG. 13. This double contoured seat 16c design aids in providing tissue blood circulation and helps alleviate friction, rubbing and soreness. In fact the ability of the personal carriage to achieve four stable positions; to the back, to the front, to the left, and to the right also aids blood circulation by seat pressure variation.

As discussed above, the free-pivoting caster-type wheels 18 allow the user to easily move away from or towards an encountered obstacle 52 as in FIG. 3. The free-pivoting wheel 18 is shown attached to each front corner of the base frame assembly 13 as in FIGS. 1, 2, 4, 7, 10, and 14. Likewise, a steerable wheel 20 is rotatably attached to each back corner of the base assembly 13 as also shown in FIGS. 1, 2, 4, 6, 7, 10, and 14.

Centered between the pivoting wheels 18 and the steerable wheels 20 is located the power wheel 22 which is rotatably fitted to the slots 14f and 14g in the right and left power-wheel supports 14e, 14h as shown in FIGS. 1, 2, 4, and 14.

The combination of the two pivoting wheels 18, the center power wheel 22 or the two steerable wheels 20 and center power wheel 22 provide a stable 2-1 or 1-2 pattern that resembles a dual tricycle or a "bitrike [T.M.]." In order for the bitrike to function as designed, it is necessary that the installed power wheel have its lowest tangent point below the tangent line between the bottoms of the free-pivoting wheels 18 and the bottoms of the steerable wheels 20. Thus allowing the wheels 18 or 20 to selectively pivot vertically about the lowest tangent point of the power wheel 22 as best seen in FIGS. 2 and 3.

Figure 11A:
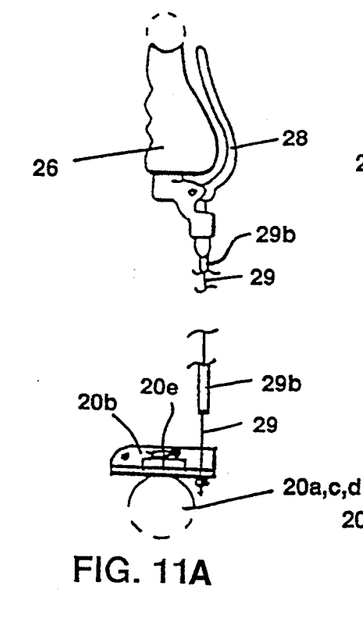
Figure 11B:
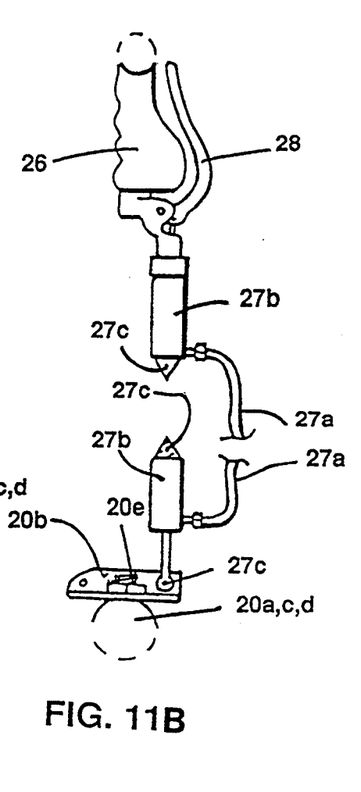
Figure 12A:
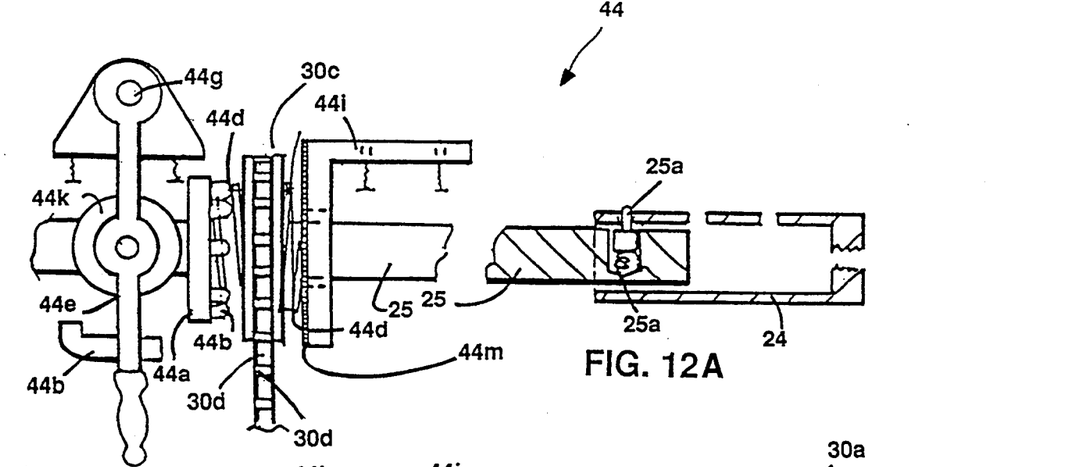
Figures 12B, 12C:
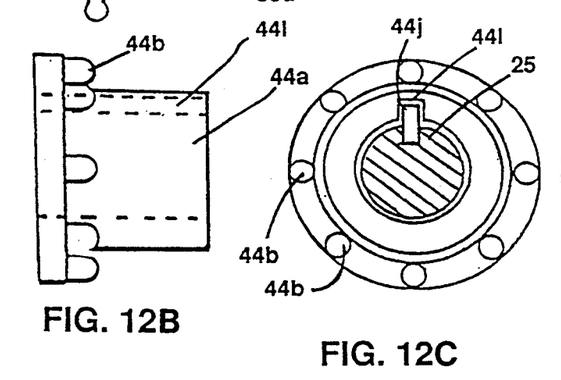
Figure 12D:
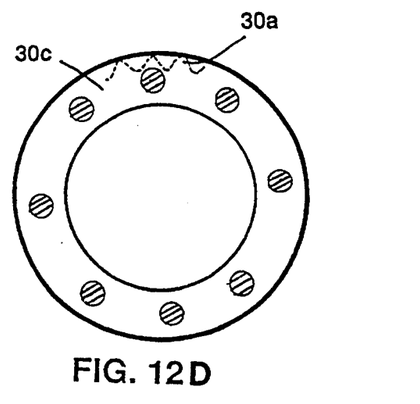

The power wheel 22 is rotated by a rotating means that includes a mechanical or electric drive mechanism. This includes such mechanisms as a hand powered ring The preferred mechanical drive consists of dual opposed hand cranks 24 that are connected to a common hand crank shaft 25 as shown in FIG. 1 and 12. The dual opposed hand cranks 24 are adjustable horizontally via shaft width release/locking mechanism 25a to accommodate different body widths of various riders or storage in a car. A feature of the hand cranks 24 is the orthoganally mounted thumb and finger lever 26 as best shown in FIGS. 1, 2, 3, and 11. The change of angle mounting of the cranks 24 provides a minimization of crank width and a lever closer to the operator during operation.

The handcranks 24 may include: A) a thumb and finger lever 26, as shown in FIGS. 1 and 2 which includes means for controlling the steering angle of the steerable wheels 20; B) a pivoted squeeze lever 28 as detailed in FIG. 11A, which is connected to flexible push/pull steering cables 29a that mechanically slide within the steering cable sheath 29b and control the steering angle of the two steerable wheels 20; and or C) a thumb and finger lever 26 that includes at least one hydraulic line 27a and a corresponding piston 27b mounted via piston pivots 27c as shown in FIG. 11B that hydraulically control the steering angle of the two steerable wheels 20.

A typical power wheel 22 rotating device may consist of a manual chain drive assembly 30 as beat shown in FIG. 1 and 12. This assembly consists of a chain sprocket 30a that is rigidly attached to the axle 23 of the power wheel 22. The dual opposed hand crank shaft 25 includes a free turning chain sprocket wheel 30c which rotates freely on a shaft drive idler 44a that includes a series of pins 44b which may engage holes 44c in the chain sprocket wheel 30c when pressed against spring 44d by the drive lever bearing 44k mounted on the drive lever assembly 44e. The shaft drive idler 44a is free to slide on the hand crank shaft 25 but is forced to turn with it by means of a slip fit woodruff key slot 44L and a woodruff key 44j pressed into the hand crank shaft 25 as shown in FIG. 12C. Thus, when the cranks 24 are rotated, the drive chain 30d rotates the power wheel 22 via its chain sprocket 30a. The operator can push sideways drive lever handle 44f used as a first class lever pivoted at the drive lever pivot 44g and is locked in the drive position by drive lock 44h.

In FIG. 12A the drive lever assembly 44e is shown rotated 90 degrees into the plane of the paper for the purpose of clarity. The drive lock 44h allows the dual opposed hand crank 24 mechanism to: A) drive the carriage forward or backward; B) by the the operator pushing the drive lever handle 44f further to the right to brake the shaft drive idler 44a against the cemented friction brake surface 44m on the fixed brake bracket 44i, and hence brake the carriage motion via the connecting chain 30d, chain sprocket wheel 30c, and power wheel 22; C) and by releasing the drive lock 44h holding of the drive lever assembly 44e, the drive idler pins 44b disengage from the sprocket wheel 30c. This allows the hand crank shaft 25 and thumb and finger levers 26 to turn freely for a best position during vehicle mounting or pushing. An alternate method of driving the power wheel is a vertical push pull lever 32 which rotates on a drive lever pivot 32a shown in FIGS. 14 and 15. The push pull lever 32 pulls and pushes a paddle shaped member 32b which carries an upper rack 32e and a lower rack 32d which face each other. The paddle shaped member slides and rotates about pin 32e. When the push-pull lever is pushed forward, the lower rack 32d drives the power wheel spur gear 30b. As the push pull lever 32 is reversed and pulled back, the pivot control 32f rotates the paddle shaped member 32b so that the lower rack 32d is disengaged and the upper rack 32c rotates -the chain sprocket wheel in the same direction as before. Pivot control 32f is moved by link 32h from small lever 32g which moves from one position to another as the push-pull lever 32 is changed from a push to a pull. Position A is reverse in drive motion, B is neutral, and C is forward in drive motion.

Figures 7, 8, 9:
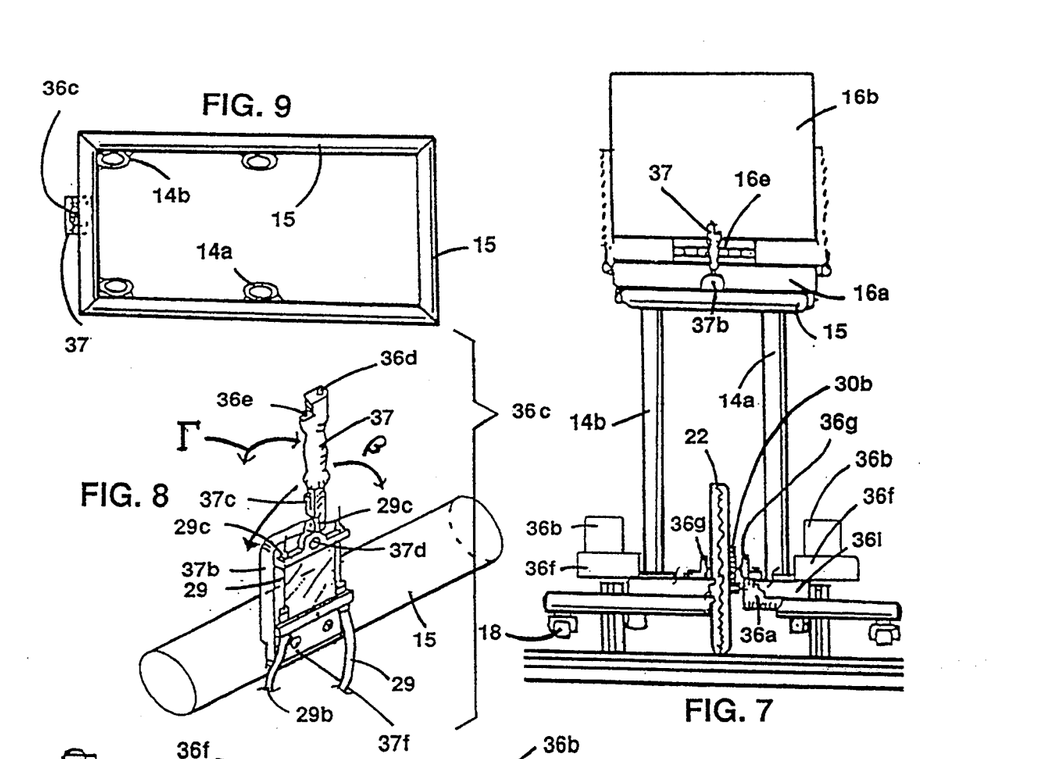
FIG. 7 is a front end elevational view of the present invention incorporating an electric motor drive.
FIG. 8 is an isometric view showing how the steering and electrical control assembly is attached to the front bar of the seat assembly support frame.
FIG. 9 is the top plan view of the entire power wheel seat support frame assembly showing the attachment of the steering and electrical control assembly.
Figure 10:
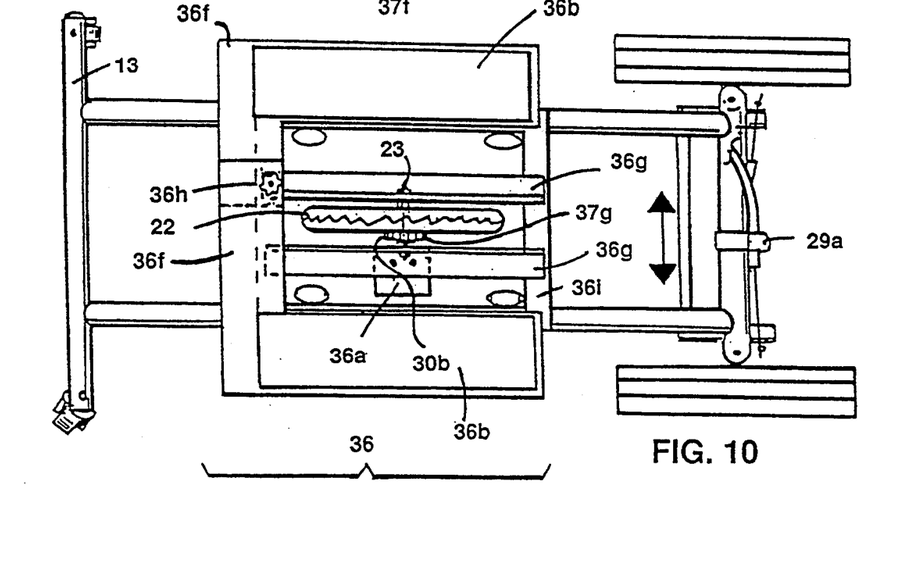
FIG. 10 is a top plan view of the electric drive base frame assembly showing the removable battery assembly.

In lieu of a mechanical power wheel rotating device, an electric power wheel drive 36 as shown in FIG. 7, 8, and 10 may be employed. A typical electrical drive includes a reversible d-c motor 36a that is coupled via driving gear 37g to the power wheel spur gear 30b on the power wheel 22. The reversible d-c electric motor 36a is powered by appropriate removable batteries 36b located on a removable battery support 36f located on the battery support frame 36i which is permanently mounted on the base frame assembly 13. The power to the reversible electric motor 36a attached to one of the motor/power wheel bracket 36g permanently attached to the battery support frame 36i. The motor is controlled by a control module 36c accessible to the user and that controls the power to and the rotational direction of the reversible electric motor 36a. By removing the thumb screw lock the two removable battery supports 36f can be separated into two support-battery assemblies (not shown separately)to minimize handling weight. FIG. 8 shows a combined motor/steering control module. For easier mounting, the electric control handle 37 can be folded down by depressing the handle folding lock 37c. The top of the handle has the motor on/off switch 36d and the motor reversing switch 36e and the handle pivots left and right via the handle pivot 37d which attaches to the handle support 37b affixed by attachment screws 37f to the seat assembly support frame 15. Moving the handle thus pulls on control cables 29 to turn the steering mechanism described in FIGS. 6A, 6B, or 11A. The electric control handle thus controls the direction of travel of the balance shifted personal carriage 19 as determined by the steerable wheels 20 which are angularly articulated in parallel to allow forward and back motion steering.

The means for selectively steering each of the wheels 20 is best accomplished by a steering mechanism as shown in FIG. 5A and B, This mechanism consists of a steering link 20b that is activated by a control cable 29 that controls the steering angle of one of the two wheels 20. A similar arrangement on the other wheel 20 controls turning in the opposite direction. Since the cables 29 can only pull, the four bar linkage of the steering mechanism allows each cable to reverse the angle achieved by the other cable 29. The two steering links 20b are connected to the ends of a tie bar 21 with tie bar pins 21a. The steering links 20b rotate the steerable wheels 20 via their steerable wheel axles 20e affixed to the steerable wheel pins 20a. The base frame assembly 13 bear on thrust bearings 21b captured on the steerable wheel pins 20a and are kept in place by keeper plates 20c and lock screws 20d. The control cable sheath 29b is clamped to the frame 13 by clamps 29a. The control cables are tied to each steering link 20b by a steering cable lock 29c.

As shown in FIG. 2 the seat assembly support frame 15 may include a fender 38c located on a structural member to fit around part of the rotational arc of the power wheel 22. This fender serves as a shield to substantially prevent water and gravel that may be propelled upwardly by the wheels from striking the seated rider. Similar fenders can be used on the steerable wheels 20.

When a rider wants to mount or dismount the carrier, the power wheel 22 should be locked and the free pivoting caster type wheels 18 should be restrained from touching the floor. Referring to FIGS. 6a and 6c, this is accomplished by the combination offset safety leg 68 and wheel lock 62.

The mounted rider leans back in the carrier onto the steerable wheels 20, uses the control ratchet 63 to rotate the offset safety leg 68 wheel lock 62 on the safety shaft 61 from the horizontal position of FIG. 6a to the vertical position of FIG. 6c. The control ratchet 63 is used until the two safety feet 60 contact the ground and the wheel lock 62 contacts the power wheel 22. If the seated rider 45 leans forward, the travel limit 64 prevents the offset safety leg 58 from deflecting further because of the offset configuration of the offset safety legs 58 which also keep the pivoting wheels from contacting the ground. The ratchet 63 can be reversed by conventional mechanism to allow the offset safety legs 58 and wheel lock 62 to be rotated back to the horizontal position.

While the invention has been described in complete detail and pictorially shown in the accompanying drawings, it is not to be limited to such details, since many changes and modifications may be made to the invention without departing from the spirit and the scope thereof. Hence it is described to cover any and all modifications and forms which may come within the language and scope of the claims.

We claim:

1. A balance shifted personal carriage comprising:
    a) a base frame assembly,
    b) a seating assembly attached to said base frame assembly,
    c) a free-pivoting wheel attached to each front or back corner of said base frame assembly,
    d) a steerable wheel attached to said base frame assembly at each corner opposite the corners where said pivoting wheels are attached,
    e) a power wheel attached to said base frame assembly and substantially centered between said pivoting wheels and said steerable wheels, where said power wheel is mounted with its lowest tangential point below the tangential line between said pivoting wheels and said steerable wheels, wherein said power wheel is driven by a manual drive assembly having dual opposed hand cranks that are connected to a common hand crank shaft, wherein each of said hand cranks further comprise a thumb or finger lever which functions in combination with a squeeze lever that is connected to a means for controlling the steering angle of the two steerable wheels, and
    f) wherein said carriage is operable in either of two modes of operation: in Mode 1, the seated rider shifts his or her weight backwards to allow the steerable wheels to pivot downwardly with respect to said pivoting wheels, and make contact with the floor surface allowing said carriage to be steered by the seated rider; in Mode 2, the seated rider shifts his or her weight forward to allow said steerable wheels to rise above the floor and said pivoting wheels to make contact with the floor surface allowing the seated rider to pivot and move said carriage away from an obstacle in a direction opposite the pushing or pulling direction.

2. The carriage as specified in claim 1 wherein said means for controlling the steering angle of the two steerable wheels comprises flexible steering cables that are connected to said squeeze lever and that mechanically slide and control the steering angles of said steerable wheels.

3. The carriage as specified in claim 1 wherein said means for controlling the steering angle of the two steerable wheels comprises at least one hydraulic line and corresponding pistons that are connected to said squeeze lever and that hydraulically control the steering angle of said steerable wheels.

4. The carriage as specified in claim 1 wherein said manual drive assembly comprises a manual chain drive assembly further comprising:

a) a chain sprocket rigidly attached to the axle of said power wheel,
b) a chain sprocket wheel attached to the common shaft of said dual opposed hand cranks, and
c) a drive chain loopingly attached around the chain sprocket and chain sprocket wheel, so that when said hand cranks are rotated said power wheel also rotates, where the chain drive assembly is controlled by a drive lever assembly having a drive lever handle, where activating the drive lever handle forces against a spring so a shaft drive idler with pins can engage holes in the chain sprocket wheel to allow the hand crank shaft and its coupling to drive the drive chain which in turn, drives a main power wheel sprocket and hence the power wheel and where a drive lock exists to hold the shaft drive idler in this control position.

5. The carriage as specified in claim 4 wherein additional force on the drive lever assembly will compress a spring between the chain sprocket wheel and a fixed brake bracket with a friction brake surface and thus provide a braking action.

6. The carriage as specified in claim 5 where release of the drive lock holding the drive lever assembly will thereby disengage the shaft drive idler from the holes in the chain sprocket wheel and thus disengage the hand crank shaft and its drive action.

7. The carriage as specified in claim 1 wherein said power wheel is driven by at least one push-pull reciprocating vertical drive lever that activates a paddle shaped member containing an upper rack and a lower rack capable of engaging a power wheel spur gear to drive said power wheel.

8. A balance shifted personal carriage comprising:
a) a base frame assembly,
b) a seating assembly attached to said base frame assembly,
c) a free-pivoting wheel attached to each front or back corner of said base frame assembly,
d) a steerable wheel attached to said base frame assembly at each corner opposite the corners where said flee-pivoting wheels are attached,
e) a power wheel attached to said base frame assembly and substantially centered between said free-pivoting wheels and said steerable wheels, where said power wheel is mounted with its lowest tangential point below the tangential line between said free-pivoting wheels and said steerable wheels, and where said power wheel is driven by:
(1) a removable battery,
(2) a reversible d-c motor that is coupled to said power wheel by means of driving gears and operated by the power from said battery,
(3) a motor steering control module accessible to the seated rider and that controls both the power to and the rotational direction of said motor by means of a motor on/off key switch and a motor reversing switch respectively, wherein said motor steering control further comprises an electric control handle that pivots about a handle pivot and its distant portions capture the flexible steering cables where their steering cable sheaths are clamped to the handle support so that its left-right movements of the cables effect the steerable wheel angles which are angularly articulated in parallel to allow forward and back motion steering, and f) means for selectively steering each of said steerable wheels.

9. The carrier as specified in claim 8 wherein said motor/steering control comprises an electric control handle that pivots about a handle pivot and its distant portions capture the steering cables where their steering cable sheaths are clamped to the handle support so that its left-right movements of the cables effect the steerable wheel angles which are angularly articulated in parallel to allow forward and back motion steering.

10. A balance shifted personal carriage comprising:
A) a base frame assembly comprising:
a) a right member,
b) a left member,
c) a front member rigidly attached to the right and left members, and
d) a back member rigidly attached between the front and left members,
B) a power wheel and seat support frame assembly comprising:
a) a vertical right member located normal and rigidly attached to the right member of said base frame assembly and having a substantially centered right power wheel axle attached to a right power wheel support,
b) a vertical left member located normal and rigidly attached to the left member of said base frame assembly and having a substantially centered left power wheel axle attached to a left power wheel support in concentric alignment with the right power wheel support, where said power wheel and seat support frame assembly is rigidly attached to said base frame assembly by the vertical right and left members,
C) a seat adjustably attached to said power wheel and seat support frame assembly,
D) a free-pivoting caster wheel rigidly attached to each front corner of said bass frame assembly,
E) a steerable wheel rotatably attached to each back corner of the back member of said bass frame assembly,
F) a power wheel having an axle that is connected to the power wheel supports on said power wheel and seat support frame assembly, where when said power wheel is mounted, its lowest tangential point is below the tangential plane tangent to said steerable wheels and said free-pivoting wheels, wherein said plans may selectively pivot about the power wheel axle,
G) means for rotating said power wheel, and
H) means fop selectively steering said steerable wheels.

11. The carriage as specified in claim 10 wherein said carriage is operable in either of two modes of operation: in Mode 1, the seated rider shifts his or her weight backwards to allow the steerable wheels to pivot downwardly, and make contact with the floor surface allowing said carriage to be steered by the seated rider and in Mode 2, the seated rider shifts his or her weight forward to cause said steerable wheels to rise above the floor and allow said free-pivoting wheels to make contact with the floor surface allowing the seated rider to pivot and move said carriage away from an obstacle by pushing away from the obstacle or pulling on the obstacle to allow said free pivoting wheels to move said carriage in a direction controlled by the pushing or pulling.

12. The carriage as specified in claim 10 wherein said means for rotating said power wheel consists of a manual drive assembly comprising dual opposed hand cranks that are connected by a common hand crank shaft.

13. The carriage as specified in claim 11 wherein said steerable wheels are angularly articulated in parallel to allow forward and back motion steering.

14. The carriage according to claim 12 where each hand crank's grip area and thumb and finger lever is at right angles to the main crank shaft.

15. The carriage as specified in claim 14 wherein each of said hand cranks further comprise a thumb and finger lever and at least one hydraulic line and corresponding pistons that hydraulically control the steering angle of said steerable wheels.

16. The carriage as specified in claim 10 wherein mounting and dismounting is aided by use of a pair of offset safety legs and wheel lock stabilizing the carriage comprising a rotatable safety shaft that actuates two offset safety legs and a power wheel lock and which are positioned to lock or unlock by a reversible control ratchet by the seated rider or prior to mounting.

17. The carriage as specified in claim 10 wherein the power wheel is partially covered by a shielding fender to prevent water from being centrifugally thrown upward to the rider when the personal carriage is used on wet ground.

18. A balance shifted personal carriage comprising:
a) a base frame assembly,
b) a seating assembly attached to said base frame assembly,
c) a free-pivoting wheel attached to each front or back corner of said base frame assembly,
d) a steerable wheel attached to said base frame assembly at each corner opposite the corners where said free-pivoting wheels are attached,
e) a power wheel attached to said base frame assembly and substantially centered between said free-pivoting wheels and said steerable wheels, where said power wheel is mounted with its lowest tangential point below the tangential line between said free-pivoting wheels and said steerable wheels, where said power wheel is driven by a manual drive assembly having dual opposed hand cranks that are connected to a common hand crank shaft, and
f) means for selectively steering each of said steerable wheels.

* * * * *